US011775909B2

(12) United States Patent
Reaume et al.

(10) Patent No.: US 11,775,909 B2
(45) Date of Patent: Oct. 3, 2023

(54) MONITORING OPERATOR CONDITION USING SENSOR DATA

(71) Applicant: Caterpillar Inc., Peoria, IL (US)

(72) Inventors: Daniel J. Reaume, Midland, IL (US); Kyle J. Cline, Savoy, IL (US); Michael E. Sharov, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 178 days.

(21) Appl. No.: 17/219,801

(22) Filed: Mar. 31, 2021

(65) Prior Publication Data
US 2022/0318705 A1 Oct. 6, 2022

(51) Int. Cl.
G06Q 10/0639 (2023.01)
G01M 99/00 (2011.01)
G06N 20/00 (2019.01)

(52) U.S. Cl.
CPC ...... *G06Q 10/0639* (2013.01); *G01M 99/005* (2013.01); *G06N 20/00* (2019.01)

(58) Field of Classification Search
CPC .. G06Q 10/0639; G01M 99/005; G06N 20/00
See application file for complete search history.

(56) References Cited

U.S. PATENT DOCUMENTS 7,218,974 B2 5/2007 Rumi et al.
11,295,400 B2* 4/2022 Grossman ........ G06Q 10/06311
11,347,205 B2* 5/2022 Celia ..................... H04L 1/0002
11,436,484 B2* 9/2022 Farabet ................ G06N 3/0454
2010/0032434 A1* 2/2010 Kevan .................... B65D 77/02
220/495.06
2014/0276090 A1* 9/2014 Breed .................. A61B 5/1455
600/473
2015/0379457 A1* 12/2015 Jackson ........... G06Q 10/06398
705/7.17
2017/0248965 A1* 8/2017 Wellman .............. G05D 1/0297
2018/0082051 A1* 3/2018 Gibbs ..................... G06F 21/34
2019/0092337 A1* 3/2019 Chua ..................... B60W 30/14
2020/0175778 A1* 6/2020 Ziegler ................. G06Q 10/06
2020/0342988 A1* 10/2020 Lymperopoulos ..... G08B 25/10
2022/0121867 A1* 4/2022 Arar ...................... B60W 50/14

* cited by examiner

Primary Examiner — Dylan C White

(57) ABSTRACT

Systems and methods for monitoring an operator of an asset are described herein. The method includes receiving training data, the training data comprising training sensor data associated with one or more tasks performed by a plurality of operators of different skill levels and under different performance impairments. The method can also include training a machine learning model to recognize one or more operator conditions based on the received training data and receiving sensor data from a plurality of sensors associated with the asset or the operator. The method can further include determining an operator condition of the operator based on the received sensor data and the machine learning model and taking one or more actions in response to the determined operator condition.

20 Claims, 5 Drawing Sheets

MONITORING OPERATOR CONDITION USING SENSOR DATA

TECHNICAL FIELD

The present disclosure relates to a system and method for monitoring the condition of an operator of an asset using one or more sensors.

BACKGROUND

The performance of assets, such as heavy machinery, vehicles, construction equipment, and the like, depends on both the condition of the equipment and of its operator. An operator who is fatigued, under the influence of drugs or alcohol, poorly trained, or otherwise incapacitated may pose a health and safety risk to themselves or others in a work environment, in addition to driving reduced productivity and higher costs while using the asset. Even lesser conditions, such as mild fatigue of an operator or improper training, can lead to incorrect usage of the asset, and therefore cause unnecessary damage or wear.

Identifying the condition of the operator is challenging, as the condition of the operator may change over the day. For example, an operator without enough sleep or who doesn't take enough breaks while completing challenging tasks may become fatigued. In another example, they may take a stimulant to overcome fatigue that itself drives its own effects, such as hyperactivity or inattentiveness. In a further example, an operator may become incapacitated, such as suffering a medical condition such as a heart attack or stroke. In yet another example, an operator may operate an asset incorrectly due to poor training.

Camera systems are currently used to detect fatigue and other issues by monitoring an operator's face, but these require extra camera hardware and may prove problematic in different lighting conditions or if the operator is wearing sunglasses. Cameras may also be unable to pick up on conditions outside of fatigue or distress, such as certain medical conditions or poor training of an operator.

Current systems can utilize sensor data to suggest improvements to operating processes in the event of an operator failure. For example, U.S. Pat. No. 7,218,974 to Rumi et. al. (hereinafter "Rumi") describes a method for optimizing an industrial process data. Data is collected from a plurality of sensor elements, the plurality of sensor elements each monitoring a portion of an industrial process. A machine learning algorithm then analyzes the data from the plurality of sensor elements to determine an efficiency of the industrial process and generates a recommendation for optimizing the industrial process in case of operator failure. The machine learning algorithm can identify machine fault and event downtimes and then direct the production manager to undertake specific remedial actions if and when required for a given fault or failure related to a given machine, input material and/or worker.

While Rumi describes using machine learning algorithms to analyze sensor data and provide recommendations for optimizing process in response to a failure of an operator, Rumi makes no mention of detecting a condition of an operator using on-board sensors and mobile devices, such as smartphones and smart watches, associated with the operator. Rumi instead only monitors the efficiency of a process, and not the behavior of the operator within the process. For example, an expert operator may be operating an asset quite efficiently, but his actions might be impacted by a mild heart attack in a way that, compared to his previous actions, would indicate a problem. The asset might operator at the same rate, but movements of the operator may be less smooth, or actions of the operator may put bystanders at greater risk than actions performed under a normal operating condition. Rumi fails to identify these behaviors, and is instead focused only on identifying efficiency within a process.

The example systems and methods described herein are directed toward overcoming the one or more of the deficiencies described above.

SUMMARY OF THE INVENTION

According to a first aspect, a method can include receiving training data, the training data comprising training sensor data associated with one or more tasks performed by a plurality of operators of different skill levels and under different performance impairments. The method can include training a machine learning model to recognize one or more operator conditions based on the received training data. The method can include receiving sensor data from a plurality of sensors associated with the asset or the operator. The method can include determining an operator condition of the operator based on the received sensor data and the machine learning model. The method can also include taking one or more actions in response to the determined operator condition.

According to a further aspect, a computer-readable medium can comprise instructions that are executable by one or more processors. The instructions cause the one or more processors to perform a process. The process can comprise receiving training data, the training data comprising training sensor data associated with one or more tasks performed by a plurality of operators of different skill levels and under different performance impairments. The process can comprise training a machine learning model to recognize one or more operator conditions based on the received training data. The process can comprise receiving sensor data from a plurality of sensors associated with the asset or the operator. The process can comprise determining an operator condition of the operator based on the received sensor data and the machine learning mode. The process can also comprise taking one or more actions in response to the determined operator condition.

According to another aspect, a computing device for monitoring an operator of an asset can comprise one or more processors and a memory comprising instructions. When executed by the one or more processors, the instructions cause the one or more processors to perform a process. The process can comprise receiving training data, the training data comprising training sensor data associated with one or more tasks performed by a plurality of operators of different skill levels and under different performance impairments. The process can comprise training a machine learning model to recognize one or more operator conditions based on the received training data. The process can comprise receiving sensor data from a plurality of sensors associated with the asset or the operator. The process can comprise determining an operator condition of the operator based on the received sensor data and the machine learning model. The process can also comprise taking one or more actions in response to the determined operator condition.

BRIEF DESCRIPTION OF THE DRAWINGS

The detailed description is described with reference to the accompanying figures. In the figures, the left-most digit of a reference number identifies the figure in which the reference

DETAILED DESCRIPTION

Figure 1:
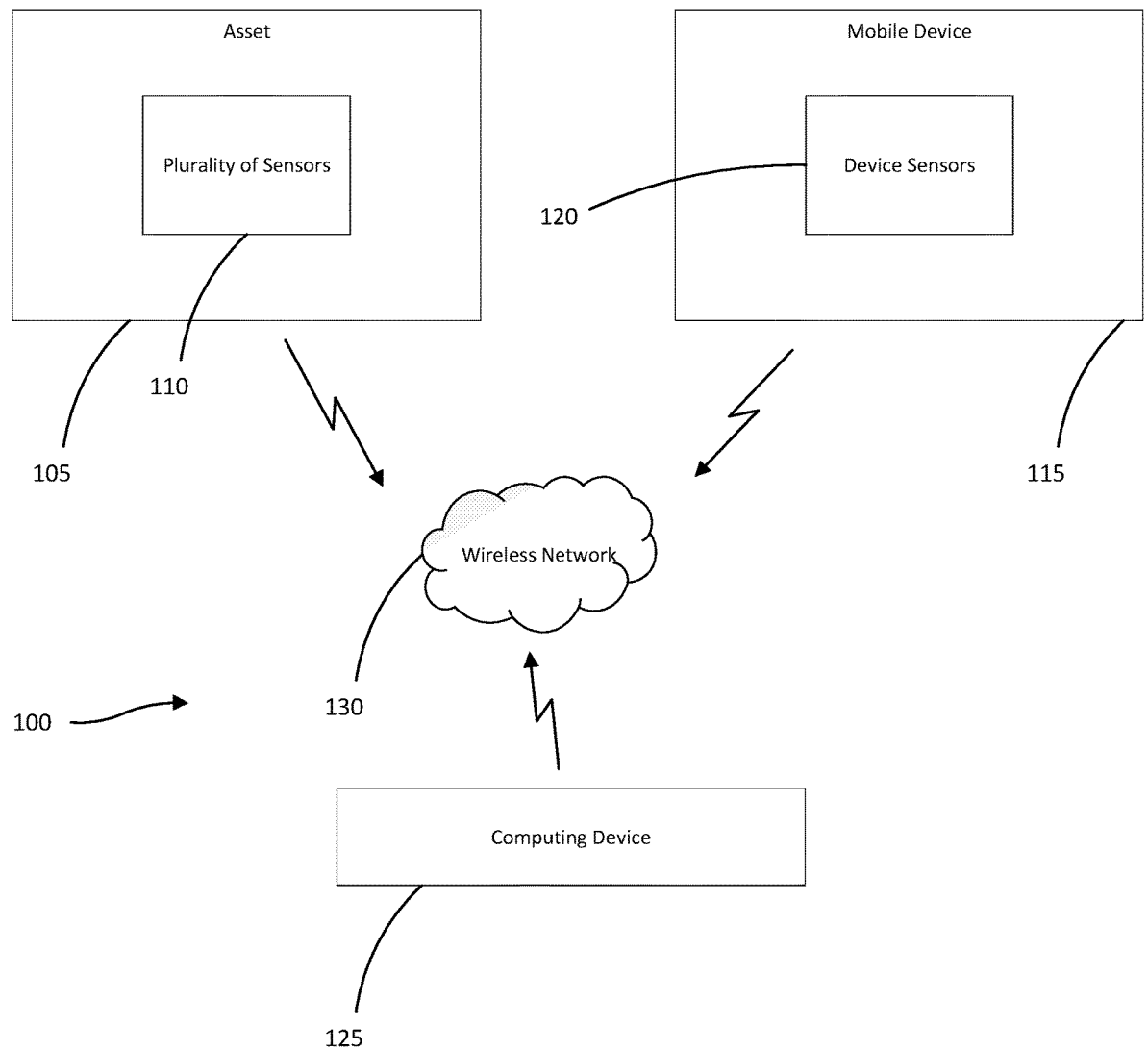
FIG. 1 is a block diagram illustrating one implementation of a system for monitoring an operator of an asset.

FIG. 1 is a block diagram illustrating a system 100 for monitoring an operator of an apparatus according to some implementations. The system 100 includes an asset 105. The asset 105 can be a vehicle, such as a tractor, an automobile, a construction vehicle (such as an excavator), an industrial machine (such as a table saw), and the like. The asset 105 is operated by an operator, who controls functionality of the asset 105, such as operating a boom arm of an excavator, driving an excavator around a work site, and the like. The asset 105 includes a plurality of sensors 110. The plurality of sensors 110 can include sensors designed to gather data about operation of the asset, such as hydraulic pressure sensors, speed and acceleration sensors, actuation sensors for components of the asset (such as sensors for detecting if a boom arm is extended or retracted), brake sensors, temperature sensors, global positioning system sensors, and other sensors. The data gathered by the plurality of sensors can be presented to the operator of the asset 105 via a display, such as a human-machine interface, a series of light-emitting diodes, a touch-screen, and the like. The data from the plurality of sensors 110 can also be provided to a remote server for storage and analysis via a communication interface, such as being provided to the remote server by a wireless communication circuit or a wired communication circuit.

The system 100 also includes a mobile device 115 associated with the operator of the asset 105. The mobile device 115 can be a smart phone, a smart wearable, a tablet computer, and the like. The mobile device 115 can include device sensors 120, which are designed to gather data associated with the operator of the asset 105. For example, if the mobile device 115 is a smart watch or a smart phone, the device sensors 120 can determine biometric data about the operator, such as heart rate, EKG data, breathing data, blood oxygen levels, and other data. The device sensors 120 provide the gathered data to the mobile device 115, which can store the gathered data for later analysis, present the data to the operator on a display screen of the mobile device, present analyzed data to the operator, and the like. For example, the mobile device 115 can analyze heart rate data to determine if the operator has experienced an irregular heartbeat and then notify the operator of the irregular heartbeat. The mobile device 115 can also provide the gathered data to a remote server for storage and analysis via a wireless communication circuit.

The system 100 includes a computing device 125. The computing device 125 can receive data from both the asset 105 and the mobile device 115 over a wireless communication network 130 or by other communication means, such as a direct wired connection in between the computing device 125 and the like. In some implementations, the computing device 125 can be located on-board the asset 105. In other implementations, the computing device 125 can be a remote computing device.

Figure 2:
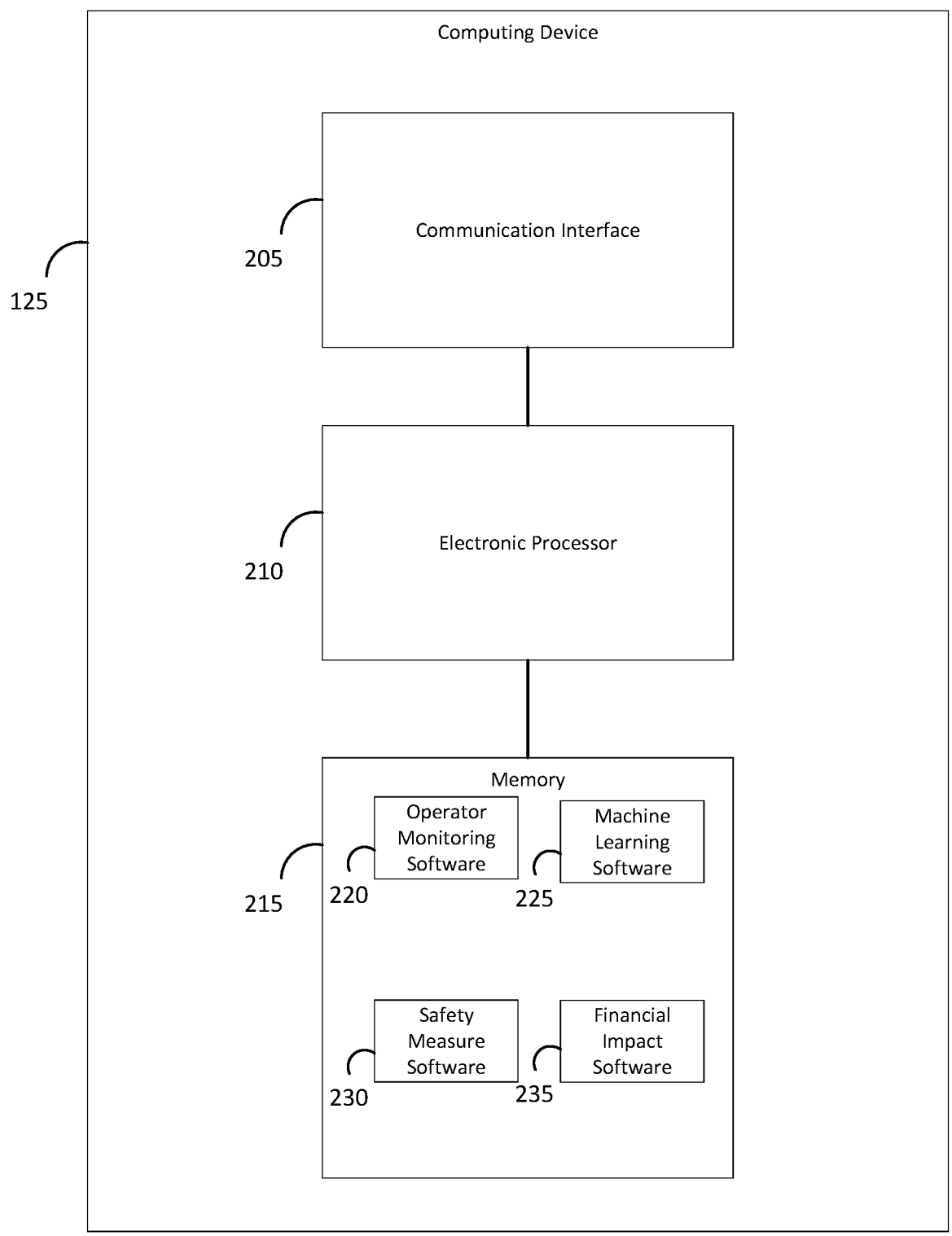
FIG. 2 is a block diagram illustrating one implementation of a computing device.

FIG. 2 is a block diagram illustrating computing device 125 according to one implementation. The computing device 125 can include a communication interface 205, a processor 210, and a memory 215. The computing device 125 can be a server, a desktop computer, a laptop computer, a tablet computer, a mobile phone, or any other The communication interface 205 can be wireless and/or wired data communication interfaces, such as interfaces for Wi-Fi connections, cellular data connections, satellite data connections, Ethernet connections, and/or any other type of data connection. As described herein, the communication interface 205 can receive data from one or more computing devices, such as mobile device 115 or an on-board computer of the asset 105, transmit data to one or more computing devices, and/or send or receive any other type of data.

The processor 210 may operate to perform a variety of functions, as set forth herein. In some examples, the processor 210 may include a central processing unit (CPU), a graphics processing unit (GPU), both CPU and GPU, or other processing units or components known in the art.

The memory 215 can be volatile and/or non-volatile computer-readable media including integrated or removable memory devices including random-access memory (RAM), read-only memory (ROM), flash memory, a hard drive or other disk drives, a memory card, optical storage, magnetic storage, and/or any other computer-readable media. The computer-readable media may be non-transitory computer-readable media. The computer-readable media may be configured to store computer-executable instructions that can be executed by the processor 210 to perform the operations described herein, as well as program modules, program data, and/or one or more operating systems. Additionally, the processor 210 may possess local memory, which also may store program modules, program data, and/or one or more operating systems.

The memory 215 can include one or more software programs for performing the methods and functions described herein. For example, the memory 215 can include operator monitoring software 220, machine learning model 225, safety measure software 230, and financial impact software 235.

Operator monitoring software 220 receives sensor data from the plurality of sensors 110 of the asset 105 and the device sensors 120 of the mobile device 115. Operator monitoring software 220 can detect an operator condition based on the received data inputs from the plurality of sensors 110 and/or the device sensors 120. The operator condition indicates a physical condition of the operator, such as "focused" or "on task," "distracted," "mildly fatigued," "heavily fatigued," "unresponsive," "medical emergency," and the like. The operator condition can also include "untrained," "poorly trained," "adequately trained," and other status conditions indicating the effectiveness of the operator of the asset 105. If the operator is impaired in any way, operation of the asset 105 can be dangerous. For example, if the operator is heavily fatigued while operating a construction vehicle, the operator may become easily distracted or may be slow to respond to objects in a work environment of the construction vehicle, putting themselves, others at a work site, or private property at risk. Operator monitoring software 220 can pass the data to the machine learning software 225, which can analyze the data and determine the operator condition based on the results of the machine learning software 225 processing the sensor data.

Machine learning software 225 includes a machine learning model that is trained using training data. The training data includes training sensor data associated with one or more tasks performed by a plurality of operators with different skill levels and/or one or more performance impairments, such as suffering a medical emergency, suffering severe fatigue or distraction, and other impairments to operation of an asset. The training data can then be associated with known outcomes, such as a known condition of the operator associated with training sensor data, to train the machine learning model to identify an operator condition based on a set of sensor data inputs. In some implementations, the training data can include real-world operational data and known outcomes associated with that data (e.g., sensor data from past operations of a similar asset and known operator conditions associated with the sensor data from past operations) and/or can include data obtained for the purpose of training the machine learning model.

The training procedure will adjust parameters of the machine learning model to minimize the machine learning model's error in reproducing the known outcomes when presented with the training data. In some implementations, the machine learning model can be a regression model, a support vector machine, a neural network, a classification tree, or another suitable machine learning model utilizing supervised training. For example, a linear regression model can adjust linear equation parameters to predict outputs as a linear function of inputs to the machine learning model. In another example, a neural network can be trained to provide particular weights to particular nodes within the network to understands patterns in input data and provide the correct outcome based on the input data.

The machine learning model can predict a classification, such as predicting a particular operator condition, or predict a value, like a regression or percentage of full efficiency the operator is at. A threshold rule can be used to set a final classification appropriately based on risks of the operator condition. For example, even if there is only a 10% probability that the operator is suffering from a particular impairment or condition, it can be advantageous to classify the operator as suffering from the impairment or condition in order to ensure safety of the operator, the asset 105, and others in the same area of the asset.

In one implementation, the training sensor data can be gathered from sensors associated with assets similar to the asset 105 while operators of different skill levels perform various tasks using the assets. For example, sensor data can be collected while operators of different skill levels drive an asset. In some implementations, the operators can also be wearing impairing clothing, such as vision-impairing glasses or goggles or movement-impairing clothing. Sensor data can be taken while the operators of different skill levels operate the asset with the impairing clothing being worn. The collected sensor data can then be used to at least partially train the machine learning model to recognize sensor data patterns associated with operators of different skill levels and/or different impairments, such as reduced vision or limited mobility.

In some implementations, a biomechanical model can be used to simulate sensor data. For example, a software program can generate the biomechanical model to mimic an operator of an asset at a particular skill level and/or with a particular impairment, such as reducing a reaction time of the biomechanical model, making the biomechanical model follow suboptimal operation strategies or common beginner approaches to operating the asset, and the like. Data gathered from virtual sensors associated with a virtual asset the biomechanical model operates on can then be used to at least partially train the machine learning model.

In some implementations, historical data can be gathered from other operators of various skill levels that have operated the asset 105 or other similar assets in the past. The historical data can then be associated with known operator conditions that occurred while the historical data was being collected by sensors. For example, one training item of the training data can include various sensor measurements that are input into the machine learning model with a known outcome that the operator suffered a medical emergency while the sensor measurements were being collected. This historical data and known outcome associated with the historical data can then be used to at least partially train the machine learning model.

In some implementations, the historical data can include limitations associated with various assets. For example, the asset can be an excavator. If an excavator is operated with maximum boom arm extension with high hydraulic pressure, the excavator is more likely to tip over, which can harm the operator and others in the area of the excavator. These limitations associated with various types of assets can be used to at least partially train the machine learning model to identify when the asset is being operated at unsafe parameters.

In some implementations, the training sensor data can include data from both an asset and from data gathered from one or more mobile devices associated with the operator, such as a heart rate or blood oxygen monitor. For example, certain biometric statistics or data, such as high heart rate or low blood oxygen levels, can indicate that the operator is suffering a medical emergency, severe fatigue, or distraction as an operator condition. These biometric statistics can be used as inputs to the machine learning model with the known operator condition to at least partially train the machine learning model.

In some implementations, the training sensor data can include one or more known sensor readings associated with a particular performance impairment. For example, if a driving speed of an asset drastically increases in a small amount of time, the operator may be incapacitated and leaning against a throttle of the asset. In another example, if the steering wheel suddenly begins turning in only one direction and maintains steering in the same direction, the operator may be incapacitated and holding the steering wheel in one direction. These known sensor readings and associated performance impairments can e use to at least partially train the machine learning model.

Safety measure software 230 receives the operator condition from the operator monitoring software 220 and determines one or more actions to take based on the operator condition. For example, if the operator condition indicates that the operator is suffering a medical emergency, the safety measure software 230 can generate a command to safely stop the asset 105, such as generating a command to reduce a speed of the asset 105 and steer away from a work site or other people in the vicinity of the asset 105 to minimize the risk of injuring others in the work site. In some implementations, a supervisor of the operator of the asset 105 can be notified of the medical emergency, and proper medical authorities can be contacted to handle the emergency.

Other examples of the safety measure software 230 in operation can include generating a command to temporarily shut down the asset 105 in response to detecting operator fatigue, generating a command to provide guidance messages or proper operation graphics to the operator in response to determining that the operator is not properly trained, generating a command to stop operation of the asset 105 in response to irregular biometric data (such as an excess heart rate) until the irregular biometric data is corrected (e.g., heart rate returns to normal levels), and the like. In each of the examples, a supervisor can be notified, the event can be logged, and other actions can also be taken.

Financial impact software 235 can perform analysis on the collected sensor data to determine a performance impact or safety impact of the operator condition on the operator, the asset 105, the work site, others at the work site, other property of the owner of the asset 105, public property, and the like.

Financial impact software 235 can receive data from the plurality of sensors 110, device sensors 120, and other sources, such as user-input observations, data logs, performance measurements, maintenance logs associated with the asset 105, inspection logs of the asset 105, fuel usage logs of the asset 105, and the like. The financial impact software 235 can use a financial model or rule-based model to analyze the collected data and provide recommendations as described below.

For example, financial impact software 230 can determine that, when an operator is fatigued, productivity of the operator goes down a particular percentage and risk of incidents go up a particular percentage. The financial impact software 235 can use this analysis to assist the safety measure software 230 in determining counter-actions to take in response to the operator condition. The financial impact software 235 can also check operator condition against one or more compliance rules to ensure that the owner of the asset 105 is in compliance with various reporting requirements, such as safety requirements, practices that reduce carbon emissions or particulates, and the like. In one example, financial impact software 235 can use sensor data from carbon emission sensors and the operator condition to determine that an operator, while distracted, will perform practices while operating the asset 105 that increases carbon emissions from the asset 105. This data can be logged and used for reporting purposes to improve training of operators or address individual operators on distractions while working.

Financial impact software 235 can also monitor quality and results of training for operators. For example, if the operator has recently undergone training, the collected sensor data can be used by the financial impact software 235 to determine if the operator is following best practices from the training. Based on the determination of the operator following best practices, the financial impact software 235 can provide feedback on the effectiveness of the training and provide recommendations to the operator on how to better implement the received training.

Financial impact software 235 can also detect operator inefficiencies that drive productivity losses/inefficiencies to and communicate these productivity losses/inefficiencies to the operator, a supervisor of the operator, a customer hiring the operator and/or asset 105. For example, financial impact software 235 can identify that a particular operator is fatigued more than average, which leads to unproductive time while operating the asset 105. Financial impact software 235 can inform the operator and/or a supervisor of the operator about these prolonged periods of fatigue and provide recommendations to the operator or supervisor for countermeasures that can be taken, such as more frequent breaks or shorter durations of operating the asset 105.

Financial impact software 235 can also monitor a financial impact of the operator condition on the asset 105. For example, if the operator is distracted, the operator is not performing work, and is therefore costing the customer or the company money for work not performed, wasted resources, and the like. Financial impact software 235 can determine the financial impact of the operator condition, such as the financial impact of the operator being distracted or fatigued. Financial impact software 235 can suggest one or more actions to be taken based on the financial impact of the operator condition, such as suggesting shorter shifts for individual operators so efficient work can be maintained. In some implementations, the financial impact software 235 can compare cost of countermeasures for transitioning to another operator state to the cost of continuing to operate in the current operator state. For example, continuing to operate with mild fatigue after two hours without a break will reduce productivity by X dollars over the next hour whereas the cost of a 15 minute break to eliminate fatigue is Y dollars. Based on the comparison of X and Y, an action can be selected.

In another example, wear modeling can be performed by financial impact software 235. Based on data received from the plurality of sensors 110, a degree of wear of the asset 105 can be determined by the financial impact software 235. The degree of wear can indicate an amount of wear of components of the asset 105 caused by usage of the asset 105 over time. The determined degree of wear can be weighted against the value of the work performed by the asset 105, such as comparing an amount of wear caused per hour of use of the asset 105 to an amount of production performed or profit generated by the use of the asset for that hour. Based on the comparison, an optimal tradeoff of wear to production or profit can be determined. The optimal tradeoff can be determined based on the type of work being performed. For example, if the asset 105 is a mining machine, slower digging in clay can be preferable, as the increased production and profit that can be gained by faster digging is not worth the amount of wear caused by the digging. In contrast, if the asset 105 is mining gold ore, faster digging and more wear may be more desirable, as the profit is much greater.

Similar computations and determinations can be made regarding resource usage for operating the asset 105. For example, an engine rotations per minute (RPM) can be monitored and a fuel usage rate can be determined for the asset 105. If the productivity of the asset 105 is not worth the fuel spent for faster operation, the operator of the asset 105 can be informed that slower operation of the asset is allowable or that a break can be taken. In another example, if the asset 105 is a vehicle, an optimal movement speed for the vehicle can be determined based on productivity or profit coming from the vehicle (such as moving valuable assets) being compared against the cost of fuel and wear and tear on the vehicle.

The financial factors used by the financial impact software 235 can be based on empirical data, such as total amount of fuel used and total amount of money invested in the asset 105, or on mathematical models. For example, if the asset 105 includes an engine, a mathematical model can determine that the engine, when operating at 400 RPM consumes X gallons of fuel per minute. In another example, if the asset 105 includes hydraulics, a mathematical can determine an amount of wear and tear (e.g., a lifespan) per hour being consumed when the hydraulics are operated at a particular pounds per square inch (PSI) level. The empirical data and mathematical models can be used by the financial impact software 235 to determine, among other things, Operating the asset 105 while the operator of the asset 105 is experiencing an adverse condition, such as a medical emergency or fatigue, can change the calculations using the empirical data and the mathematical models. For example, the operator experiencing an adverse condition can affect the productivity of the asset 105, and can modify one or more variables in a mathematical model, such as adjusting an amount of profit or productivity that is produced from operating the asset 105 under particular conditions.

In some implementations, financial impact software 235 can use received data, such as the sensor data, as inputs to a physics-based model or another model to simulate possible financial impact scenarios based on the sensor data. For example, financial impact software 235 can simulate a possible financial impact scenario based on the sensor data, such as sensor data indicating that an impact between the asset 105 and another asset, another person, or a structure in a work site is at risk of occurring. Based on this simulation, financial impact software 235 can estimate financial impact of performing a task with the asset 105 with the particular operator condition indicated by the sensor data.

Figure 3:
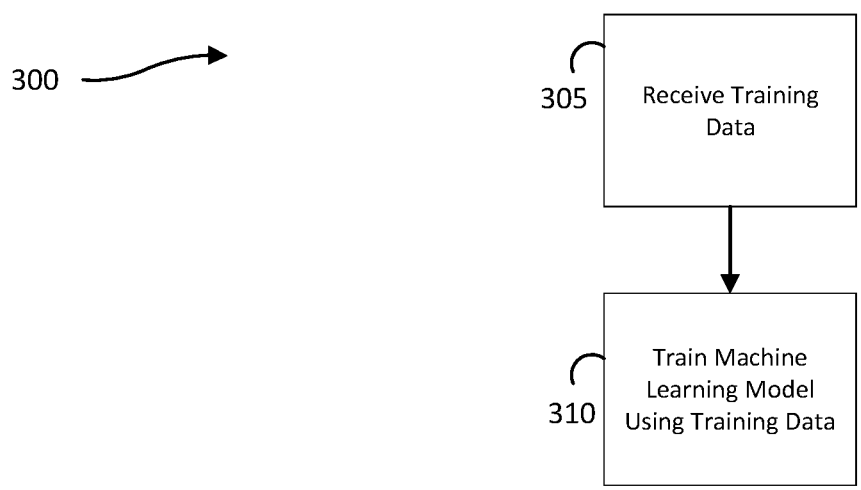
FIG. 3 is a flow chart illustrating a process used in some implementations for training a machine learning model for identifying an operator condition of an operator of an asset.

FIG. 3 is a flow chart illustrating a process 300 used in some implementations for training a machine learning model for identifying an operator condition of an operator of an asset, such as asset 105.

At block 305, process 300 receives training data. As discussed above in relation to the machine learning software 225, the training data can include training sensor data generated from real-world training examples, historical data, simulated data from a biomechanical model, data from a plurality of sensors associated with the asset, data from sensors associated with a mobile device of the operator, and the like. The training data also includes a known operator condition associated with each data item of the training data.

At block 310, process 300 trains the machine learning model using the received training data and known operator conditions. The machine learning model is trained using supervised learning, which associates the sensor data input with a known output, like the known operator condition. Using a large set of training inputs and known operator conditions, the machine learning model can be trained to correlate the sensor data inputs to operator conditions. After the machine learning model is trained, the machine learning model will take sensor data from the asset and from the mobile device associated with the operator and determine an operator condition based on the input sensor data.

Figure 4:
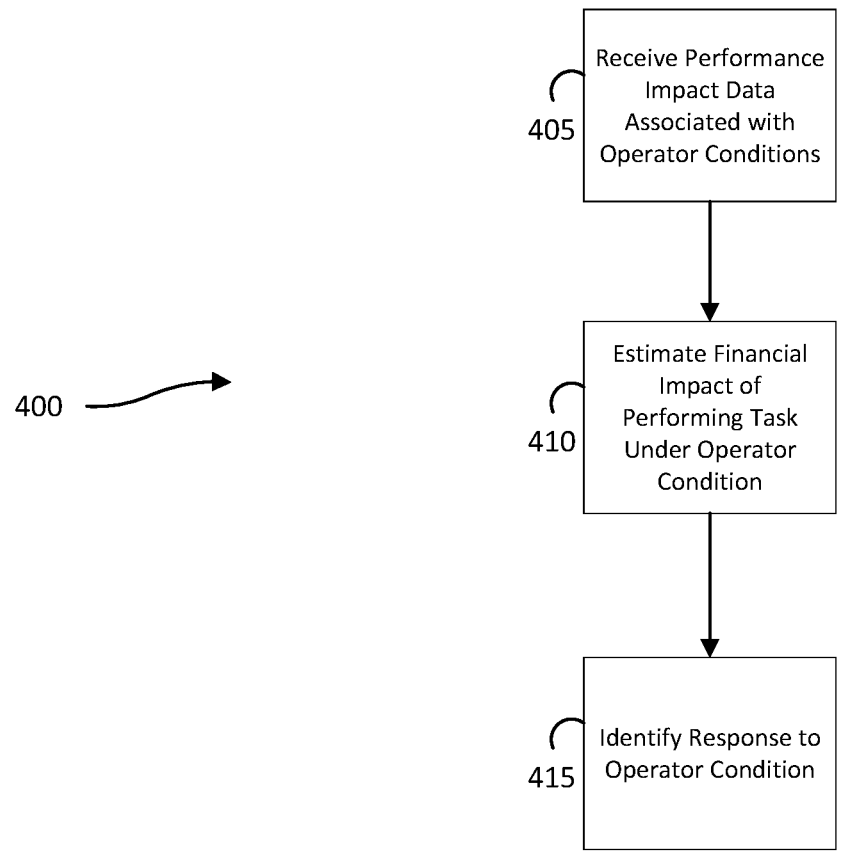
FIG. 4 is a flow diagram illustrating a process used in some implementations for identifying a response to an operator condition.

FIG. 4 is a flow diagram illustrating a process 400 used in some implementations for identifying a response to an operator condition.

At block 405, process 400 receives performance impact data associated with one or more operator conditions. As described above in relation to safety measure software 230 and financial impact software 235, performance impact data can include data collected from sensors or from other sources that measure the impact on the performance of the operator when the operator is experiencing a particular operator condition, such as fatigue. For example, the performance impact data can indicate that an operator's productivity decreases while the operator is suffering from fatigue, which costs the company employing the operator time and money.

At block 410, process 400 estimates the financial impact of performing a task while the operator is under the operator condition. As described above with relation to the financial impact software 235, based on the performance impact data of the operator condition on the task being performed. For example, if the operator is fatigued or distracted, the cost of allowing the operator to operate an asset in the impaired state can be compared to the cost of letting the operator rest or take a break. In some implementations, a financial model or a machine learning model associated with finances can be used to estimate the financial impact of performing the task while the operator is under the operator condition.

At block 415, process 400 identifies a response to an operator condition based on the performance impact data and/or the estimated financial impact of performing the task while the operator is under the operator condition. As described above with relation to the safety measure software 230 and financial impact software 235, an action can be taken in response to a particular operator condition being detected and/or the financial impact of performing a current task while the operator is under the operator condition. In one example, if a medical emergency is detected as the operator condition, a command to stop the asset is generated by the safety measure software 230 and the estimated financial impact can be ignored, because an operator suffering a medical emergency and protecting others at the work site outweigh any other alternative action. In another example, if the operator is fatigued, the estimated financial impact can be used to decide to provide a notification to the operator about detected fatigue, provide a notification to a supervisor that a break should occur for the operator, or to let the operator continue to operate the asset.

Figure 5:
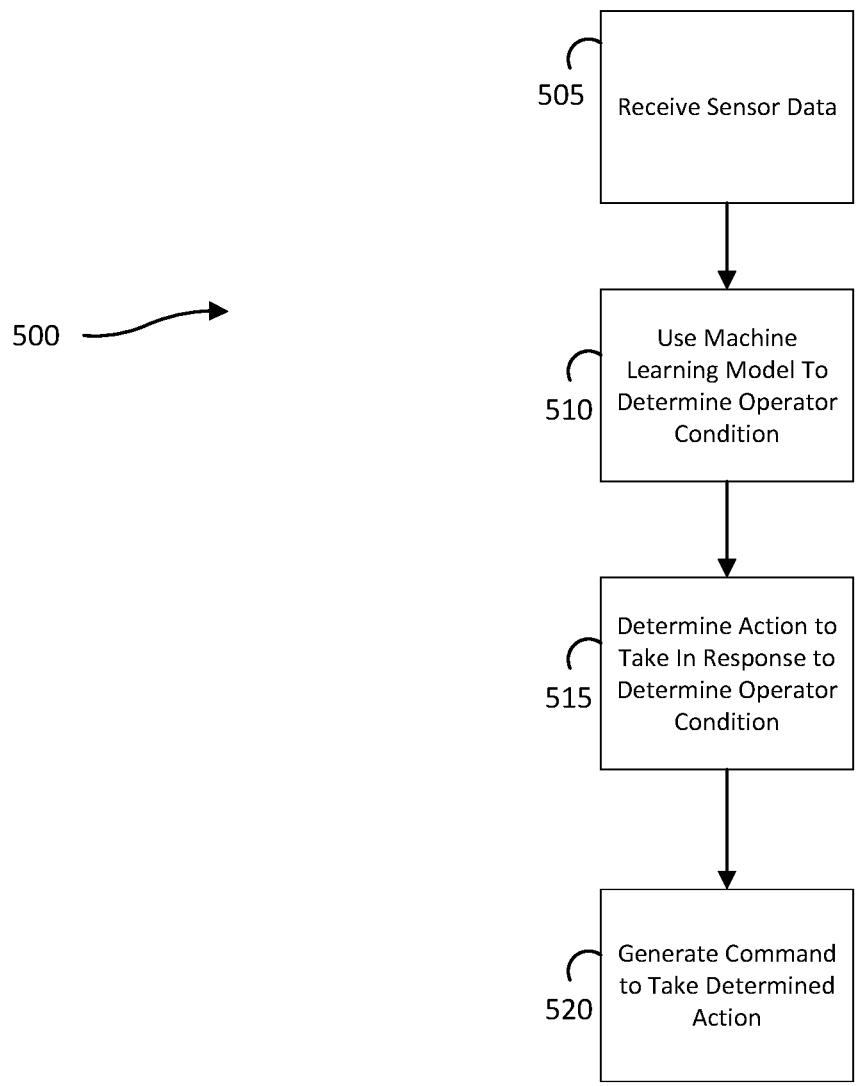
FIG. 5 is a flow chart illustrating a process used in some implementations for identifying an operator condition.

FIG. 5 is a flow chart illustrating a process 500 used in some implementations for identifying an operator condition.

At block 505, process 500 receives sensor data from one or more sensors, such as the plurality of sensors 110 of the asset 105 and the device sensors 120 of the mobile device 115 associated with the operator of the asset 105. In some implementations, the sensor data can include data about one or more characteristics of the asset 105, such as a hydraulic pressure of a component of the asset 105 or a driving speed of the asset 105, as well as including biometric data about the operator of the asset 105, such as a heart rate, blood oxygen level, breathing rate, and the like.

At block 510, process 500 uses the trained machine learning model of the machine learning model software 225 to determine an operator condition based on the received sensor data. The received sensor data is used as input into the trained machine learning model, which analyzes the received sensor data to determine the operator condition of the operator of the asset 105. For example, based on sensor data input indicating that a driving speed of the asset 105 was increased to maximum and sensor data indicating that the operator has stopped breathing for more than a few seconds, the trained machine learning model can identify that the operator of the asset 105 is suffering a medical emergency.

At block 515, process 500 determines one or more actions to take based on the identified operator condition of the operator. In some implementations, safety measure software 230 and financial impact software 235 receive the operator condition and process the operator condition and/or the sensor data to determine what action(s) to take in response to the operator condition. For example, if the operator is suffering a medical emergency, safety measure software 230 can immediately determine that actions must be taken to stop the asset 105 from operating, contact medical resources to aid the operator, and contact a supervisor of the operator to inform the supervisor of the situation. In another example, if the operator is fatigued or distracted, financial impact software 235 can determine whether it is cost-beneficial to let the operator continue working while fatigued or distracted or to provide a notification to the operator or a supervisor to relieve the operator or let the operator take a break. In a further example, financial impact software 235 can assess a quality of training of the operator, ensure compliance with one or more reporting requirements, or quantify a productivity loss of the operator based on the determined operator condition and the received sensor data.

At block 520, process 500 generates a command to take the determined action. For example, safety measure software 230 can generate a command to shut down the asset 105 and transmit the command to an on-board computer of the asset 105, which receives the command and shuts down the asset 105. In another example, financial impact software 235 can generate a command to notify the operator that he or she is distracted or fatigued and transmit the command to the on-board computer of the asset 105, which notifies the operator of the distraction or fatigue. In a further example, financial impact software 235 can generate a command to notify a supervisor of the operator that the operator is fatigued or distracted and transmit the command to a computing device associated with the supervisor, who is then notified of the operator's condition and can take steps to correct the situation.

INDUSTRIAL APPLICABILITY

The systems and methods described herein can detect when an operator of an asset is suffering from an operator condition that restricts performance or is a threat to the safety of the operator and others.

For example, based on sensor data received from one or more sensors, such as the plurality of sensors 110 and the device sensors 120, the present invention can quickly utilize a trained machine learning model to determine the condition of the operator, which enables quick intervention should a medical emergency occur and enables proper addressment of the operator being in a condition that is unproductive and wasteful.

In addition to being able to determine a condition of the operator based on sensor data and take action to address the operator condition, the sensor data and operator condition can be use to ensure compliance with regulations, identify effectiveness of training, and identify productivity losses for future improvement.

While aspects of the present disclosure have been particularly shown and described with reference to the embodiments above, it will be understood by those skilled in the art that various additional embodiments may be contemplated by the modification of the disclosed machines, systems, and method without departing from the spirit and scope of what is disclosed. Such embodiments should be understood to fall within the scope of the present disclosure as determined based upon the claims and any equivalents thereof.

What is claimed is:

1. A method for monitoring an operator of an asset, the method comprising:
   receiving training data, the training data comprising training sensor data associated with one or more tasks performed by a plurality of operators of different skill levels and under different performance impairments;
   training a machine learning model to recognize one or more operator conditions and asset statuses based on the received training data;
   receiving, from at least one asset sensor, asset data that indicates an operating status of the asset;
   receiving, from at least one biometric sensor, biometric data associated with the operator;
   determining, by the machine learning model, an operator condition of the operator has reached an impairment threshold based on the biometric data;
   identifying, by the machine learning model, at least one risk parameter in a current operation of the asset based on the operating status of the asset; and
   in response to determining the operator condition has reached the impairment threshold and the at least one risk parameter, sending, to the asset, a command that remotely shuts down operation of the asset.

2. The method of claim 1, wherein the training sensor data further comprises one or more known sensor readings associated with a particular performance impairment.

3. The method of claim 1, wherein the different performance impairments are simulated using a biomechanical model operating a simulated version of the asset.

4. The method of claim 1, wherein the training data further comprises historical data from known incidents, the known incidents including a known operator condition and one or more known sensor readings.

5. The method of claim 1, further comprising:
   collecting data on a performance impact or a safety impact of the operator condition; and
   estimating a financial impact of performing a task with the asset while the operator is affected by the operator condition based on the collected data, and
   taking one or more actions based on the financial impact of performing the task while the operator is affected by the operator condition.

6. The method of claim 5, wherein the collected data is collected using a simulation of the received sensor data.

7. The method of claim 5, wherein the one or more actions includes initiating a safety measure for the asset, providing a recommendation to the operator of the asset, assess a quality of training of the operator, ensure compliance with one or more reporting requirements, quantify a productivity loss of the operator, and recommend a countermeasure to the operator condition.

8. A non-transitory computer-readable medium comprising instructions that, when executed by one or more processors, cause the one or more processors to perform a process for monitoring an operator of an asset, the process comprising:
   receiving training data, the training data comprising training sensor data associated with one or more tasks performed by a plurality of operators of different skill levels and under different performance impairments;
   training a machine learning model to recognize one or more operator conditions and asset statuses based on the received training data;
   receiving, from at least one asset sensor, asset data that indicates an operating status of the asset;
   receiving, from at least one biometric sensor, biometric data associated with the operator;
   determining, by the machine learning model, an operator condition of the operator has reached an impairment threshold based on the biometric data;
   identifying, by the machine learning model, at least one risk parameter in a current operation of the asset based on the operating status of the asset; and
   in response to determining the operator condition has reached the impairment threshold and the at least one risk parameter, sending, to the asset, a command that remotely shuts down operation of the asset.

9. The non-transitory computer-readable medium of claim 8, wherein the training sensor data further comprises one or more known sensor readings associated with a particular performance impairment.

10. The non-transitory computer-readable medium of claim 8, wherein the different performance impairments are simulated using a biomechanical model operating a simulated version of the asset.

11. The non-transitory computer-readable medium of claim 8, wherein the training data further comprises historical data from known incidents, the known incidents including a known operator condition and one or more known sensor readings.

12. The non-transitory computer-readable medium of claim 8, the process further comprising:
collecting data on a performance impact or a safety impact of the operator condition;
estimating a financial impact of performing a task with the asset while the operator is affected by the operator condition based on the collected data, and
taking one or more actions based on the financial impact of performing the task while the operator is affected by the operator condition.

13. The non-transitory computer-readable medium of claim 12, wherein the collected data is collected using a simulation of the received sensor data.

14. The non-transitory computer-readable medium of claim 12, wherein the one or more actions includes initiating a safety measure for the asset, providing a recommendation to the operator of the asset, assess a quality of training of the operator, ensure compliance with one or more reporting requirements, quantify a productivity loss of the operator, and recommend a countermeasure to the operator condition.

15. A computing device for monitoring an operator of an asset, the computing device comprising:
one or more processors; and
a memory comprising instructions that, when executed by the one or more processors, cause the one or more processors to perform a process, the process comprising:
receiving training data, the training data comprising training sensor data associated with one or more tasks performed by a plurality of operators of different skill levels and under different performance impairments;
training a machine learning model to recognize one or more operator conditions and asset statuses based on the received training data;
receiving, from at least one asset sensor, asset data that indicates an operating status of the asset;
receiving, from at least one biometric sensor, biometric data associated with the operator;
determining, by the machine learning model, an operator condition of the operator has reached an impairment threshold based on the biometric data;
identifying, by the machine learning model, at least one risk parameter in a current operation of the asset based on the operating status of the asset; and
in response to determining the operator condition has reached the impairment threshold and the at least one risk parameter, sending, to the asset, a command that remotely shuts down operation of the asset.

16. The computing device of claim 15, wherein the different performance impairments are simulated using a biomechanical model operating a simulated version of the asset.

17. The computing device of claim 15, wherein the training data further comprises historical data from known incidents, the known incidents including a known operator condition and one or more known sensor readings.

18. The computing device of claim 15, the process further comprising:
collecting data on a performance impact or a safety impact of the operator condition; and
estimating a financial impact of performing a task with the asset while the operator is affected by the operator condition based on the collected data, and
taking one or more actions based on the financial impact of performing the task while the operator is affected by the operator condition.

19. The computing device of claim 18, wherein the collected data is collected using a simulation of the received sensor data.

20. The computing device of claim 18, wherein the one or more actions includes initiating a safety measure for the asset, providing a recommendation to the operator of the asset, assess a quality of training of the operator, ensure compliance with one or more reporting requirements, quantify a productivity loss of the operator, and recommend a countermeasure to the operator condition.

* * * * *